United States Patent
Li et al.

(10) Patent No.: US 11,361,583 B2
(45) Date of Patent: Jun. 14, 2022

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Mengping Li, Shenzhen (CN); Canhong Du, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/123,073

(22) Filed: Dec. 15, 2020

(65) Prior Publication Data
US 2021/0103714 A1    Apr. 8, 2021

Related U.S. Application Data

(63) Continuation of application No. PCT/CN2018/121261, filed on Dec. 14, 2018.

(51) Int. Cl.
*G06V 40/13*    (2022.01)

(52) U.S. Cl.
CPC ...... *G06V 40/1318* (2022.01); *G06V 40/1329* (2022.01)

(58) Field of Classification Search
None
See application file for complete search history.

(56) References Cited

U.S. PATENT DOCUMENTS

| 10,885,296 B2 * | 1/2021 | Fu ............................. G06F 13/20 |
| 2016/0026842 A1 | 1/2016 | Withers et al. |
| 2016/0170517 A1 | 6/2016 | Donnelly et al. |
| 2016/0283019 A1 | 9/2016 | Shang |
| 2017/0091513 A1 | 3/2017 | Withers et al. |
| 2017/0131810 A1 | 5/2017 | Donnelly et al. |
| 2018/0165494 A1 | 6/2018 | Kim |
| 2018/0239941 A1 * | 8/2018 | Mackey ............... G06K 9/0004 |

FOREIGN PATENT DOCUMENTS

| CN | 107247922 A | 10/2017 |
| CN | 108323208 A | 7/2018 |
| CN | 108460349 A | 8/2018 |
| CN | 207833534 U | 9/2018 |
| CN | 108885697 A | 11/2018 |
| WO | WO2016094100 A1 | 6/2016 |
| WO | WO2018082324 A1 | 5/2018 |

* cited by examiner

*Primary Examiner* — Joseph R Haley

(57) ABSTRACT

A fingerprint identification apparatus and an electronic device. The fingerprint identification apparatus includes: a fingerprint sensor; and the fingerprint sensor including an optical sensing array, wherein a spatial period N of the optical sensing array satisfies N<M/2K; wherein M is a spatial period of a light-emitting pixel array, and K is a zoom ratio between an image displayed in a sensing area of the fingerprint sensor and an image captured in the sensing area by the fingerprint sensor. By clarifying the relationship between the spatial period of the light-emitting pixel array in the display screen and the spatial period of the optical sensing array in the fingerprint sensor, it can avoid the sensor from generating moiré fringes when imaging based on light received by transmitting through the display screen, thereby improving fingerprint identification performance.

18 Claims, 8 Drawing Sheets

FINGERPRINT IDENTIFICATION APPARATUS AND ELECTRONIC DEVICE

CROSS-REFERENCE TO RELATED APPLICATIONS

This application is a continuation of International Application No. PCT/CN2018/121261, filed on Dec. 14, 2018, the disclosure of which is hereby incorporated by reference in its entirety.

TECHNICAL FIELD

Embodiments of the present application relate to the field of communications, and more particularly, to a fingerprint identification apparatus and an electronic device.

BACKGROUND

An under-screen optical fingerprint system is generally composed of a plurality of laminated layers. From top to bottom, a typical laminated layer structure includes a finger for image capturing, an organic light-emitting diode (OLED) screen, an optical imaging component, and an optical sensor. However, because the structural form of the OLED screen is similar to the structural form of the optical sensor, the optical sensor will generate moiré fringes when imaging based on light transmitted through the display screen, thereby affecting fingerprint identification performance.

SUMMARY

Provided are a fingerprint identification apparatus and an electronic device, which are capable of effectively increasing fingerprint identification performance.

In a first aspect, provided is a fingerprint identification apparatus, including:

a fingerprint sensor; and the fingerprint sensor including an optical sensing array, and a spatial period N of the optical sensing array satisfies $N<M/2K$;

wherein M is a spatial period of a light-emitting pixel array, and K is a zoom ratio between an image displayed in a sensing area of the fingerprint sensor and an image captured in the sensing area by the fingerprint sensor.

In some possible implementation manners, a range of the space period of the optical sensing array is 1 um-20 um.

In some possible implementation manners, the space period of the optical sensing array is 5.

In some possible implementation manners, the space period of the optical sensing array is equal to the sum of a size of an optical sensing unit in the optical sensing array and a distance between two adjacent optical sensing units.

In some possible implementation manners, the optical sensing array is configured to reduce the size of the optical sensing unit in the optical sensing array, so that $N<M/2K$.

In some possible implementation manners, the optical sensing array is configured to reduce the distance between the two adjacent optical sensing units in the optical sensing array, so that $N<M/2K$.

In some possible implementation manners, the fingerprint identification apparatus further includes:

an optical component;

the optical component disposed above the optical sensing array, and configured to guide a light signal emitted by the light-emitting pixel array and reflected from a human finger to the optical sensing array.

In some possible implementation manners, a value range of the K is 1-20.

In some possible implementation manners, the optical component is configured to reduce the K, so that $N<M/2K$.

In some possible implementation manners, the optical component includes:

a lens, wherein the K is a ratio between an object distance of the lens and an image distance of the lens.

In some possible implementation manners, the lens is configured to reduce the object distance of the lens, so that $N<M/2K$.

In some possible implementation manners, the lens is configured to increase the image distance of the lens, so that $N<M/2K$.

In some possible implementation manners, a row of the optical sensing array has an angel with a row of the light-emitting pixel array.

In some possible implementation manners, a line of the optical sensing array has an angel with a row of the light-emitting pixel array.

In some possible implementation manners, a range of the angle is $-15°$ to $15°$.

In a second aspect, provided is an electronic device, including:

The fingerprint identification apparatus as described in the first aspect and any one of possible implementation manners of the first aspect, and a light-emitting pixel array in the display screen; an optical sensing array in the fingerprint identification apparatus configured to receive a light signal emitted by the light-emitting pixel array and formed after being reflected from a human finger, the light signal being used for fingerprint identification.

In some possible implementation manners, a range of a space period of the light-emitting pixel array is 40 um-120 um.

In some possible implementation manners, the space period of the light-emitting pixel array includes a plurality of light-emitting pixel units, and part of the light-emitting pixel units in the plurality of light-emitting pixel units serve as an excitation light source for the fingerprint identification apparatus.

In some possible implementation manners, the other part of the light-emitting pixel units in the plurality of light-emitting pixel units are configured to emit a striped light spot.

In some possible implementation manners, the space period of the light-emitting pixel array is equal to the sum of a size of a light-emitting pixel unit in the light-emitting pixel array and a distance between two adjacent light-emitting pixel units.

In some possible implementation manners, the light-emitting pixel array is configured to increase the size of the light-emitting pixel unit in the light-emitting pixel array, so that $N<M/2K$.

In some possible implementation manners, the light-emitting pixel array is configured to increase the distance between the two adjacent light-emitting pixel units in the light-emitting pixel array, so that $N<M/2K$.

In some possible implementation manner, the display screen is an organic light-emitting diode (OLED) display screen.

Based on the above technical solution, by clarifying the relationship between the spatial period of the light-emitting pixel array in the display screen and the spatial period of the optical sensing array in the fingerprint sensor, it can avoid the sensor from generating moiré fringes when imaging based on light received by transmitting through the display screen, thereby improving fingerprint identification performance.

DESCRIPTION OF EMBODIMENTS

Technical solutions in embodiments of the present application will be described hereinafter in conjunction with the accompanying drawings.

The technical solutions in the embodiments of the present application can be applied to various electronic devices, for example, portable or mobile computing devices such as a smart phone, a notebook computer, a tablet computer and a game device, and other electronic devices such as an electronic database, an automobile and an automated teller machine (ATM), which is not limited in the embodiments of the present application.

The technical solutions in the embodiments of the present application can be used for under-screen optical image capturing, for example, under-screen biometric identification or hidden under-screen camera function, and the biometric identification may include other biometric identification in addition to fingerprint identification, for example, living body identification and the like, which is not limited in the embodiments of the present application. In order to facilitate understanding of the technical solution of the embodiment of the present application, under-screen biometric identification technology is first introduced below.

As an electronic device enters an era of full screen, a biometric capturing area on the front of the electronic device is squeezed by the full screen, and therefore, the under-display biometric identification technology has gained an increasing attention. The under-screen biometric identification technology refers to mounting a biometric identification module (such as a fingerprint identification module) under a display screen, thereby realizing a biometric identification operation inside a display area of the display screen, without setting a biometric capturing area in an area on the front of an electronic device other than the display area.

The under-screen biometric identification technology uses light returned from a top surface of a display assembly of a device for fingerprint sensing and other sensing operations. The returned light carries information of an object (e.g., a finger) in contact with the top surface, and a particular optical sensor module located under a display screen is implemented by capturing and detecting the returned light. The optical sensor module may be designed to achieve desired optical imaging by properly configuring an optical element for capturing and detecting a returned light.

Figure 1:
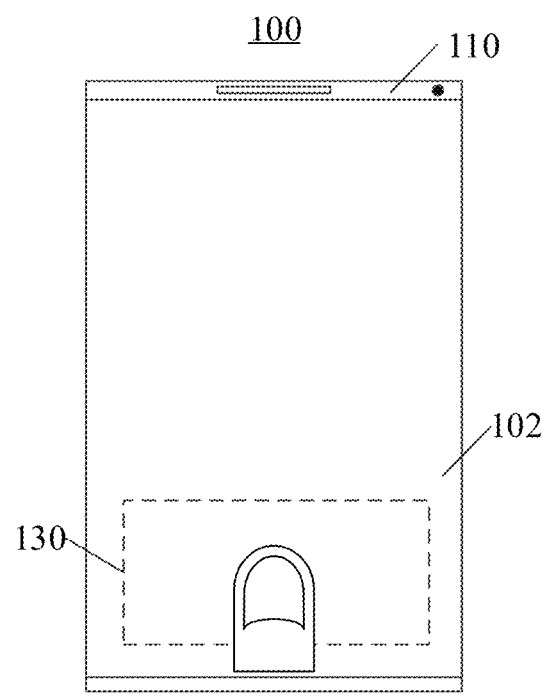
FIG. 1 is a schematic front view of an electronic device according to an embodiment of the present application.
Figure 2:
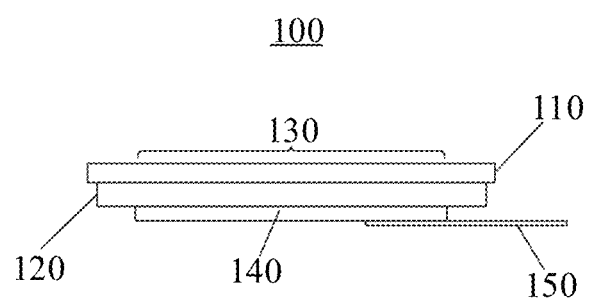
FIG. 2 is a partial cross-sectional schematic structural diagram of the electronic device shown in FIG. 1.

FIG. 1 and FIG. 2 are schematic views showing an electronic device 100 to which under-screen biometric identification technology is applicable. FIG. 1 is schematic front view of the electronic device 100, and FIG. 2 is a partial schematic cross-sectional structural view of the electronic device 100 shown in FIG. 1.

As shown in FIG. 1 and FIG. 2, the electronic device 100 may include a display screen 120 and a biometric identification module 140; and the display screen 120 has a display area 102, and the biometric identification module 140 is disposed under the display screen 120.

The display screen 120 may be a self-emitting display screen that employs a self-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application.

On the other hand, the display screen 120 is specifically a touch display screen, which may not only display a screen but also detect a touch or press operation of a user, thereby providing the user with a human-machine interaction interface. For example, in an embodiment, the electronic device 100 may include a touch sensor, and the touch sensor may be specifically a touch panel (TP), which may be disposed on a surface of the display screen 120, or may be partially integrated or entirely integrated into an interior of the display screen 120 to form a touch display screen.

The biometric identification module 140 may be specifically an optical biometric identification module, such as an optical fingerprint module, which is mainly used for capturing biometric information (such as fingerprint image information) of a user. In the embodiments of the present application, the biometric identification module 140 may be disposed at least in a partial area under the display screen 120 such that the biometric capturing area (or sensing area) 130 of the under-screen biometric identification module 140 is at least partially located in the display area 102 of the display screen 120.

As an embodiment, the biometric identification module 140 may include an optical image capturing apparatus, the optical image capturing apparatus may include a plurality of optical image capturing units, and the optical image capturing unit may specifically include a photo detector or a photoelectric sensor.

Alternatively, the optical image capturing apparatus of the biometric identification module 140 may include a photo detector array (or referred to as a photoelectric detector array, a photoelectric sensor array), including a plurality of photo detectors/photoelectric sensors distributed in an array.

Alternatively, the optical image capturing apparatus of the biometric identification module 140 may include an optical biometric sensor with an optical sensing array, such as an optical fingerprint sensor; and the optical sensing array includes a plurality of optical sensing units; the optical sensing unit may specifically include a photo detector or a photoelectric sensor, and an area where the optical sensing array is located or an optical sensing range corresponds to the biometric capturing area 130 of the biometric identification module 140.

As shown in FIG. 1, the biometric capturing area 130 is located in the display area 102 of the display screen 120. Therefore, when a user needs to unlock the electronic device 100 or perform other biometric verification, a biometric input operation can be implemented merely by pressing a finger on the biometric capturing area 130 located on the display screen 120. Since biometric capturing and detection can be implemented inside the display area 102 of the display screen 120, a front surface of the electronic device 100 in the above structure does not need to reserve space to set a fingerprint button (such as a Home button), and a full screen solution can be adopted. Therefore, the display area 102 of the display screen 120 can be substantially extended to the entire front surface of the electronic device 100.

In the embodiment of the present application, the display screen 120 adopting an OLED display screen is taken as an example, a light emitting layer of the display screen 120 has an array of OLED display units distributed in an array, and the biometric identification module 140 can utilize an OLED display unit (i.e., an OLED light source) of the OLED display screen 120 located in the biometric capturing area 130 as an excitation light source for biometric detection and identification. Of course, it should be understood that in other alternative implementations, the biometric identification module 140 may also provide a light signal for biometric detection and identification by adopting an internal light source or an external light source. In this case, the optical image capturing unit can be applied not only to a self-emitting display screen such as an OLED display screen, but also to a non-self-emitting display screen such as a liquid crystal display screen or other passive light-emitting display screens.

When a finger touches, presses, or approaches (collectively referred to as pressing for convenience of description) the biometric capturing area 130, light emitted by the display unit of the biometric capturing area 130 is reflected by the finger to form reflected light. The reflected light may carry biometric information of a user's finger. For example, after the light is reflected by a fingerprint on the surface of the user's finger, since the reflected light of a fingerprint ridge is different from that of a fingerprint valley, the reflected light carries fingerprint information of the user. The reflected light is returned to the display screen 120, received by a photo detector array of the biometric identification module 140 underneath, and converted into a corresponding electrical signal, i.e., a biometric detection signal. The electronic device 100 can obtain biometric information of the user based on the biometric detection signal, and can further perform biometric matching verification, thereby completing identity verification of the current user so as to confirm whether the user has permission to perform a corresponding operation on the electronic device 100.

In other alternative embodiments, the biometric identification module 140 may also be disposed in an entire area under the display screen 120 so as to extend the biometric capturing area 130 to the entire display area 102 of the display screen 120, thereby implementing full screen biometric identification.

It should be understood that in a specific implementation, the electronic device 100 further includes a protective cover 110, the cover 110 may be specifically a transparent cover such as a glass cover or a sapphire cover which is located on the display screen 120 and covers a front surface of the electronic device 100, and the surface of the protective cover 110 may also be provided with a protective layer. Therefore, in an embodiment of the present application, the so-called pressing finger against the display screen 120 actually refers to pressing the finger against the cover 110 on the display screen 120 or a surface of the protective layer covering the cover 110.

On the other hand, a circuit board 150, such as a flexible printed circuit (FPC) may further be disposed under the biometric identification module 140. The biometric identification module 140 may be soldered to the circuit board 150 through a pad, and achieve electrical interconnection and signal transmission with other peripheral circuits or other elements of the electronic device 100 through the circuit board 150. For example, the biometric identification module 140 may receive a control signal of a processing unit of the electronic device 100 through the circuit board 150, and may also output the biometric detection signal to the processing unit, a control unit or the like of the electronic device 100 through the circuit board 150.

Figure 3:
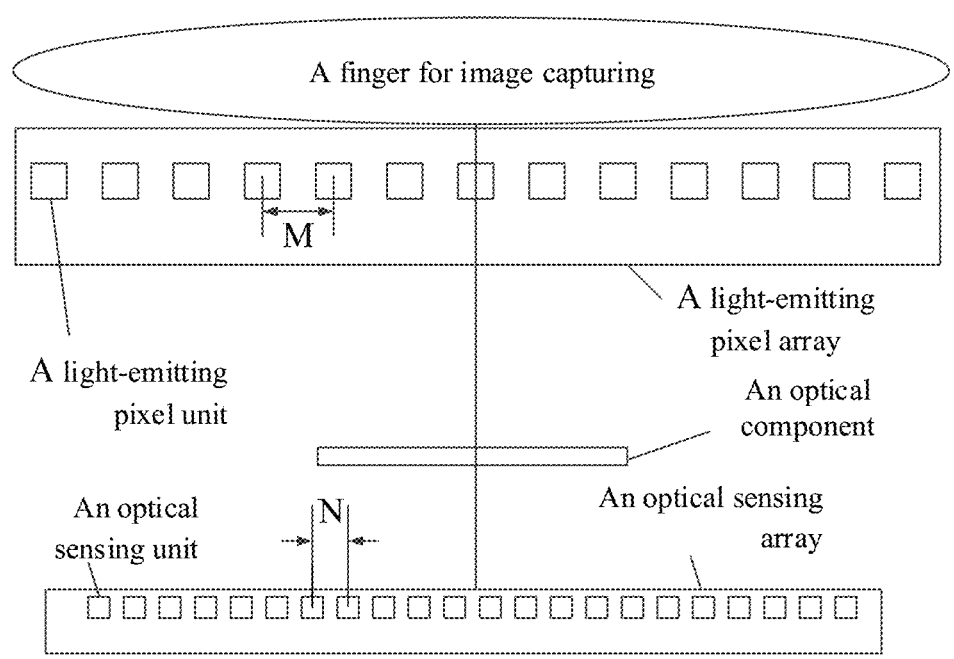
FIG. 3 is a schematic block diagram of a fingerprint identification system according to an embodiment of the present application.

FIG. 3 is a schematic block diagram of a fingerprint identification system.

As shown in FIG. 3, the electronic device 100 may be composed of a plurality of laminated layers.

Specifically, from top to bottom the electronic device may include a finger for image capturing, an organic light-emitting diode (OLED) display screen, an optical imaging component, and a fingerprint sensor. Wherein the display screen may include a light-emitting pixel array; the light-emitting pixel array includes a plurality of light-emitting pixel units, and the light-emitting pixel units may specifically include a light-emitting diode, such as an organic light-emitting diode (OLED). The fingerprint sensor includes the optical sensing array, the optical sensing array includes a plurality of optical sensing units, and the optical sensing units may specifically include a photo detector or a photoelectric sensor.

In the fingerprint identification system shown in FIG. 3, since the structural form of the OLED display screen is similar to the structural form of the optical sensor, the optical sensor will generate moiré fringes when imaging based on light transmitting through the display screen, thereby affecting fingerprint identification performance.

Figure 4:
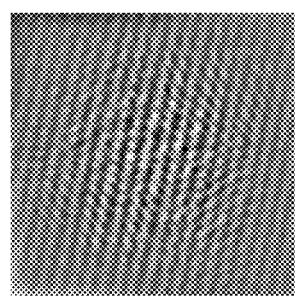
FIG. 4 is a schematic view of an image with moiré fringes imaged by the fingerprint identification apparatus according to an embodiment of the present application.

Specifically, the image captured by the fingerprint sensor may include a fingerprint image and a sampling pattern of the light-emitting pixel unit, and the sampling pattern of the light-emitting pixel unit may interfere with the fingerprint image at a constant angle and frequency, making the human eye unable to distinguish the fingerprint image and the sampling pattern of the light-emitting pixel unit. FIG. 4 is an example of an image with moiré fringes captured by the fingerprint sensor.

An embodiment of the present application provides a fingerprint identification apparatus, which can effectively solve the interference problem of moiré fringes in the imaging system, thereby improving fingerprint identification performance.

The fingerprint identification apparatus may include:

a fingerprint sensor; and the fingerprint sensor including an optical sensing array, and a spatial period N of the optical sensing array satisfies N<M/2K, wherein M is a spatial period of a light-emitting pixel array, and K is a zoom ratio between an image displayed in a sensing area of the fingerprint sensor and an image captured in the sensing area by the fingerprint sensor.

Further, after deforming N<M/2K, M/K>2N can be obtained.

Wherein M/K is a period of the sampling pattern of the light-emitting pixel unit in the image captured by the fingerprint sensor.

That is, in the image captured by the fingerprint sensor, even if the image captured by the fingerprint sensor includes a fingerprint image and a sampling pattern of the light-emitting pixel unit, the period of the sampling pattern of the light-emitting pixel unit is twice greater than that of the fingerprint image.

Furthermore, after deforming M/K>2N, 1/2f1>1/f2 can be obtained.

Wherein f1 is a capturing frequency of the sampling pattern of the light-emitting pixel unit, and f2 is a capturing frequency of the fingerprint image.

That is to say, in the image captured by the fingerprint sensor, even if the image captured by the fingerprint sensor includes a fingerprint image and a sampling pattern of the light-emitting pixel unit, the capturing frequency of the fingerprint image is also twice greater than that of the sampling pattern of the light-emitting pixel unit.

In an embodiment of the present application, the fingerprint sensor samples the fingerprint image signal from a signal emitted by the light-emitting pixel unit; according to the sampling principle, the sampling frequency of the fingerprint image is twice greater than that of the sampling pattern of the light-emitting pixel unit, and thus avoiding under-sampling of the fingerprint image in the image captured by the fingerprint sensor, thereby avoiding moiré fringes in the image captured by the fingerprint sensor, and improving fingerprint identification performance.

In summary, in the technical solution of the embodiment of the presented application, by clarifying the relationship between the spatial period of the light-emitting pixel array in the display screen and the spatial period of the optical sensing array in the fingerprint sensor, it can avoid the sensor from generating moiré fringes when imaging based on light received by transmitting through the display screen, thereby improving fingerprint identification performance.

In some embodiments of the present application, the fingerprint identification apparatus further includes:

an optical component, the optical component disposed above the optical sensing array, and configured to guide a light signal emitted by the light-emitting pixel array and reflected from a human finger to the optical sensing array.

How to satisfy N<M/2K is described in detail below.

Embodiment I

In an embodiment of the present application, an optical sensing array in a fingerprint sensor can be configured to adjust a spatial period of the optical sensing array, so that N<M/2K.

Figure 5:
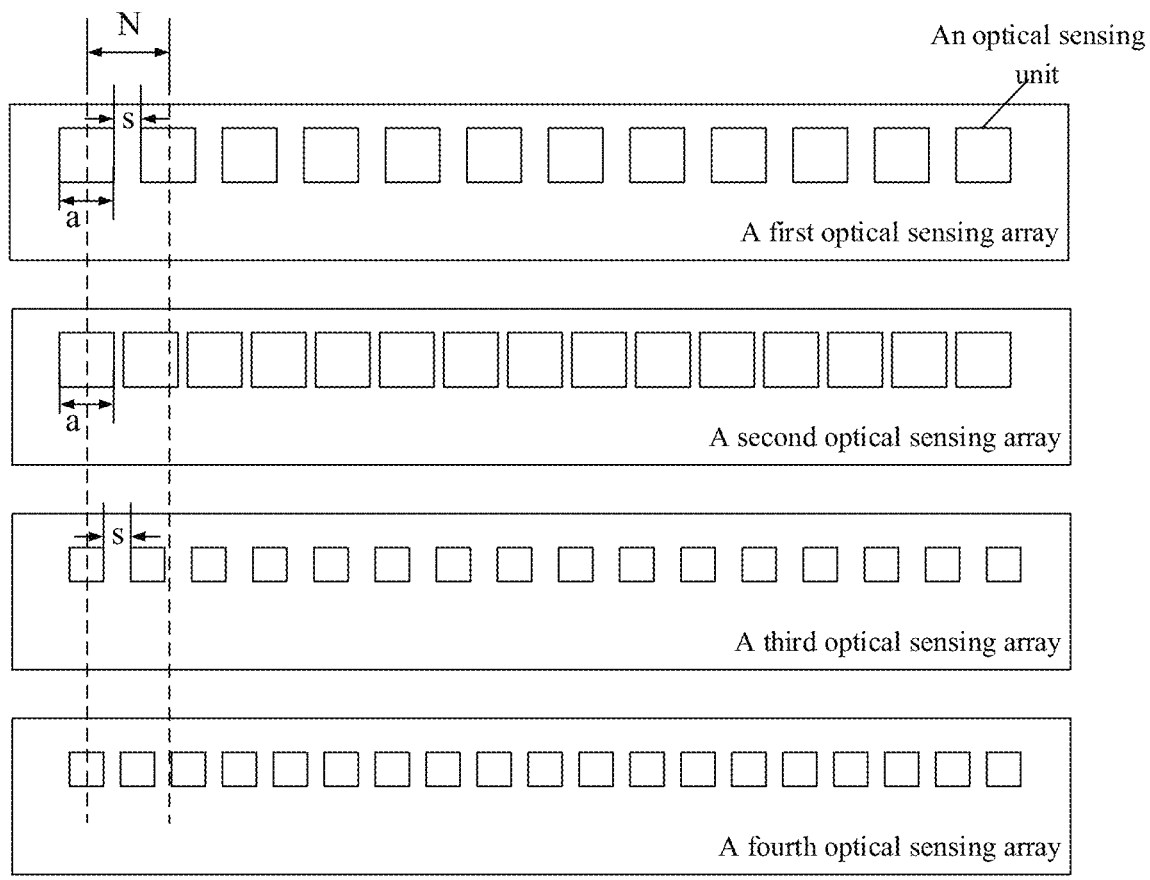
FIG. 5 is a schematic block diagram of an optical sensing array of a fingerprint sensor in the fingerprint identification apparatus according to an embodiment of the present application.

FIG. 5 is a schematic block diagram of an optical sensing array of a fingerprint sensor according to an embodiment of the present application.

As shown in FIG. 5, a space period N of the optical sensing array is equal to the sum of a size a of an optical sensing unit in the optical sensing array and a distance s between two adjacent optical sensing units.

In some embodiments of the present application, the optical sensing array may be configured to reduce the size of the optical sensing unit in the optical sensing array, so that N<M/2K. In other embodiments of the present application, the optical sensing array may be configured to reduce the distance between the two adjacent optical sensing units in the optical sensing array, so that N<M/2K.

As shown in FIG. 5, assuming that a spatial period N of a first optical sensing array is equal to 5 um, K=6.6, and M=65 um, then the relationship of M, N and K does not satisfy N<M/2K. That is to say, the image captured by the fingerprint sensor will appear moiré fringes.

In the embodiment of the present application, a+s<M/2K=4.925 can be satisfied to further ensure N<M/2K.

For example, based on maintaining the size a of the optical sensing unit in the optical sensing array, a second optical sensing array shown in FIG. 5 may reduce the distance s between the two adjacent optical sensing units, so that N<M/2K. For example, the distance s between the two adjacent optical sensing units is reduced, so that a+s<4.925.

For another example, based on maintaining the distance s between the two adjacent optical sensing units, a third optical sensing array shown in FIG. 5 may reduce the size a of the optical sensing unit in the optical sensing array, so that N<M/2K. For example, the size a of the optical sensing unit in the optical sensing array is reduced, so that a+s<4.925.

For another example, a fourth optical sensing array shown in FIG. 5 can simultaneously reduce the distance s between the two adjacent optical sensing units and the size a of the optical sensing unit in the optical sensing array, so that N<M/2K. For example, the distance s between the two adjacent optical sensing units and the size a of the optical sensing unit in the optical sensing array are simultaneously reduced, so that a+s<4.925.

It should be understood that FIG. 5 is only an example of the embodiment of the present application and should not be understood as limitation on the present application. For example, the optical sensing unit shown in FIG. 5 may further be designed into other shapes. For example, the optical sensing unit may be a rectangular, circular, or elliptical optical sensing unit. For another example, the optical sensing array shown in FIG. 5 may further include a plurality of and/or a plurality of lines of optical sensing units. For another example, the optical sensing array shown in FIG. 5 can further be designed into other array shapes. For example, a circular array.

In other alternative embodiments, the spatial period of the optical sensing array may refer to a distance between centers of the two adjacent optical sensing units in the optical sensing array.

When the optical sensing unit is of an irregular shape, or the two adjacent optical sensing units are different, the space period of the optical sensing array may be greater than or smaller than the sum of the size of the optical sensing unit and the distance between the two adjacent optical sensing units. However, the optical sensing array may still be configured to reduce the size of the optical sensing unit in the optical sensing array and/or to reduce the distance between the two adjacent optical sensing units in the optical sensing array, so that $N<M/2K$. This is not limited in the embodiment of the present application.

Embodiment II

In an embodiment of the present application, the K may be reduced, so that $N<M/2K$.

Alternatively, the optical component may be configured to reduce the K, so that $N<M/2K$.

Wherein as shown in FIG. 3, the optical component is disposed above the optical sensing array, and configured to guide a light signal emitted by the light-emitting pixel array and reflected from a human finger to the optical sensing array.

Optionally, in some embodiments of the present application, the optical component includes:

a lens, wherein the K is a zoom ratio of the lens.

Figure 6:
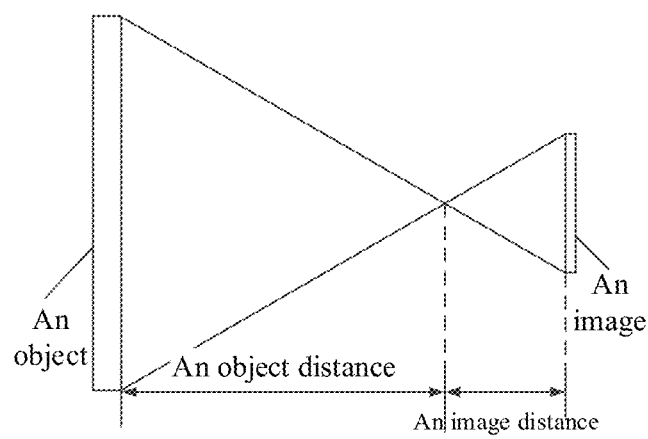
FIG. 6 is a schematic view of an imaging principle of an optical component in the fingerprint identification apparatus according to an embodiment of the present application.

FIG. 6 is a schematic view of an imaging principle of the optical component, when the optical component in the fingerprint identification apparatus according to an embodiment of the present application is a lens.

As shown in FIG. 6, the lens is configured to guide the light signal carrying information of an object (for example, a human finger) to the fingerprint sensor, so that the fingerprint sensor performs optical imaging based on the light signal. In the embodiment of the present application, the K is the zoom ratio between the object and the image. For example, the K is a ratio between an object distance of the lens and an image distance of the lens.

For example, suppose that parameter configuration of the electronic device is as follows:

$M=65$ um, $P=2.64$, $Q=0.4$, $K=P/Q=6.6$, and $N=5$ um.

Then the relationship of M, N and K does not satisfy $N<M/2K$. That is to say, the image captured by the fingerprint sensor will appear moiré fringes.

In the embodiment of the present application, $P/Q<M/2N$ can be satisfied to further ensure $N<M/2K$.

Wherein the P is the object distance of the lens, and the Q is the image distance of the lens.

Specifically, the lens is configured to reduce the object distance P of the lens, so that $N<M/2K$. In other embodiments of the present application, the lens is configured to increase the image distance Q of the lens, so that $N<M/2K$.

For example, based on maintaining the object distance P of the lens, the lens shown in FIG. 6 increases the image distance Q of the lens, so that $N<M/2K$. For example, the image distance Q of the lens is increased, so that $P/Q<6.5$.

For another example, based on maintaining the image distance Q of the lens, the lens shown in FIG. 6 reduces the object distance P of the lens, so that $N<M/2K$. For example, the object distance P of the lens is reduced, so that $P/Q<6.5$.

For another example, based on reducing the object distance P of the lens, the lens shown in FIG. 6 may simultaneously increase the image distance Q of the lens, so that $N<M/2K$. For example, based on reducing the object distance P of the lens, the lens may simultaneously increase the image distance Q of the lens, so that $P/Q<6.5$.

It should be understood that the optical component shown in FIG. 6 is only an example of the embodiment of the present application and should not be understood as limitation on the present application. For example, in other alternative embodiments, the optical component may also be an optical collimator; and in this case, $K=1$.

Embodiment III

In the embodiment of the present application, a spatial period of a light-emitting pixel array in a display screen can be set or adjusted, so that $N<M/2K$. Wherein the light-emitting pixel unit in the light-emitting pixel array serve as an excitation light source of an optical sensing unit of an optical sensing array in a fingerprint sensor.

Figure 7:
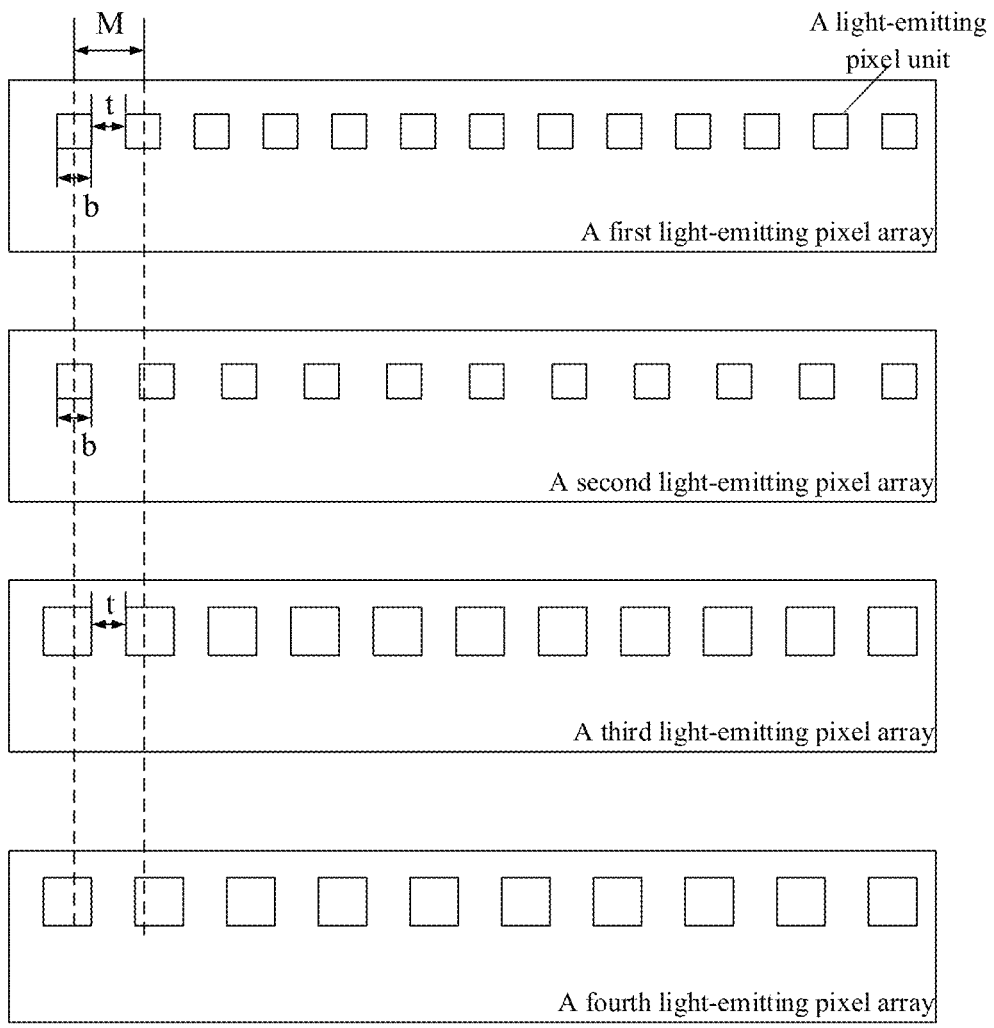
FIG. 7 is a schematic block diagram of a light-emitting pixel array of a display screen in the electronic device according to an embodiment of the present application.

FIG. 7 is a schematic block diagram of a light-emitting pixel array in a display screen according to an embodiment of the present application.

As shown in FIG. 7, a space period M of the light-emitting pixel array is equal to the sum of a size b of a light-emitting pixel unit in the light-emitting pixel array and a distance t between two adjacent light-emitting pixel units.

In some embodiments of the present application, the light-emitting pixel array may be configured to increase the size of the light-emitting pixel unit in the light-emitting pixel array, so that $N<M/2K$. In other embodiments of the present application, the light-emitting pixel array is configured to increase the distance between the two adjacent light-emitting pixel units in the light-emitting pixel array, so that $N<M/2K$.

As shown in FIG. 7, assuming that a spatial period M of a first light-emitting pixel array is equal to 65 um, $K=6.6$, and $N=5$ um, then the relationship of M, N and K does not satisfy $N<M/2K$. That is to say, the image captured by the fingerprint sensor will appear moiré fringes.

In the embodiment of the present application, $b+t>2*N*K=66$ can be satisfied to further ensure $N<M/2K$.

As shown in FIG. 7, suppose that $N<M/2K$ is not satisfied.

For example, based on maintaining the size b of the light-emitting pixel unit in the light-emitting pixel array, a second light-emitting pixel array shown in FIG. 7 may increase the distance t between the two adjacent light-emitting pixel units, so that $N<M/2K$. For example, the distance t between the two adjacent light-emitting pixel units is increased, so that $b+t<66$.

For another example, based on maintaining the distance t between the two adjacent light-emitting pixel units, a third light-emitting pixel array shown in FIG. 7 may increase the size b of the light-emitting pixel unit in the light-emitting pixel array, so that $N<M/2K$. For example, the size b of the light-emitting pixel unit in the light-emitting pixel array is increased, so that $b+t>66$.

For another example, a fourth light-emitting pixel array shown in FIG. 7 may simultaneously increase the distance t between the two adjacent light-emitting pixel units and the size b of the light-emitting pixel unit in the light-emitting pixel array, so that $N<M/2K$. For example, the distance t between the two adjacent light-emitting pixel units and the size b of the light-emitting pixel unit in the light-emitting pixel array are simultaneously increased, so that $b+t>66$.

It should be understood that FIG. 7 is only an example of the embodiment of the present application and should not be understood as limitation on the present application. For example, the light-emitting pixel unit shown in FIG. 7 may further be designed into other shapes. For example, the light-emitting pixel unit may be a rectangular, circular, or elliptical light-emitting pixel unit. For another example, the light-emitting pixel array shown in FIG. 7 may further include a plurality of and/or a plurality of lines of light-emitting pixel units. For another example, the light-emitting pixel array shown in FIG. 7 can further be designed into other array shapes. For example, a circular array.

In other alternative embodiments, the spatial period of the light-emitting pixel array may refer to a distance between centers of two adjacent light-emitting pixel units in the light-emitting pixel array.

When the light-emitting pixel unit is of an irregular shape, or the two adjacent light-emitting pixel units are different, the space period of the light-emitting pixel array may be greater than or smaller than the sum of the size of the light-emitting pixel unit and the distance between the two adjacent light-emitting pixel units. However, the light-emitting pixel array can still be configured to increase the size of the light-emitting pixel unit in the light-emitting pixel array and/or to increase the distance between the two adjacent light-emitting pixel units in the light-emitting pixel array, so that N<M/2K. This is not limited in the embodiment of the present application.

Embodiment IV

In an embodiment of the present application, a light-emitting pixel unit in the light-emitting pixel array can be configured to emit different light signals to equivalently increase a spatial period of the light-emitting pixel array.

Specifically, a space period M of the light-emitting pixel array includes a plurality of light-emitting pixel units; when the fingerprint identification apparatus is configured for fingerprint identification, part of the light-emitting pixel units in the plurality of light-emitting pixel units serve as an excitation light source for the fingerprint identification apparatus, and the other part of the light-emitting pixel units in the plurality of light-emitting pixel units emits light signals that are different from those emitted by light-emitting pixel units serving as the excitation light source for the fingerprint identification apparatus.

For example, the other part of the light-emitting pixel units in the plurality of light-emitting pixel units are configured to emit a striped light spot.

Figure 8:
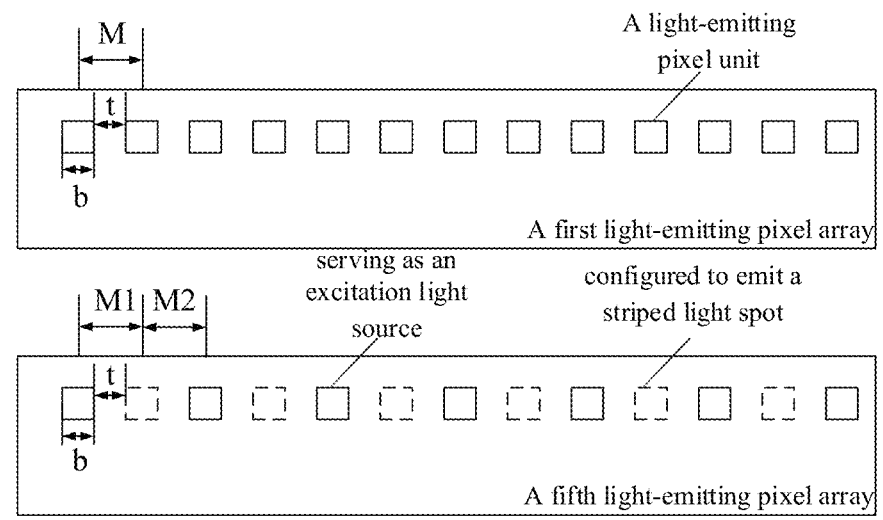
FIG. 8 is another schematic block diagram of the light-emitting pixel array of the display screen in the electronic device according to an embodiment of the present application.

FIG. 8 is another schematic block diagram of a light-emitting pixel array in a display screen according to an embodiment of the present application.

As shown in FIG. 8, assuming that the spatial period M of a first light-emitting pixel array is equal to 65 um, K=6.6, and N=5 um, then the relationship of M, N and K does not satisfy N<M/2K. That is to say, the image captured by the fingerprint sensor will appear moiré fringes.

In the embodiment of the present application, M>=66 can be satisfied to ensure N<M/2K.

As shown in FIG. 8, the light-emitting pixel units configured to emit a striped light spot in a fifth light-emitting pixel array and the light-emitting pixel unit serving as the excitation light source for the fingerprint identification apparatus are arranged at intervals. That is, a spatial period of the fifth light-emitting pixel array can be equivalent to 130, so that N<M/2K.

It should be understood that FIG. 8 is only an example of the embodiment of the present application and should not be understood as limitation on the present application.

For example, in other alternative embodiments, a plurality of light-emitting pixel units serving to emit the striped light spot may be further disposed between two adjacent light-emitting pixel units serving as the excitation light source for the fingerprint identification apparatus in the light-emitting pixel unit shown in FIG. 8.

For another example, in other alternative embodiments, a plurality of light-emitting pixel units serving as the excitation light source for the fingerprint identification apparatus may be further disposed between two adjacent light-emitting pixel units serving to emit the striped light spot in the light-emitting pixel unit shown in FIG. 8.

For another example, in other alternative embodiments, the light-emitting pixel units serving to emit the striped light spot in the light-emitting pixel unit shown in FIG. 8 may be further configured to emit light signals of other shapes or spectral ranges.

Embodiment V

Since a fingerprint image and a sampling pattern of a light-emitting pixel unit included in an image captured by the fingerprint sensor are imaged on the same plane, by clarifying the relationship between a spatial period M of a light-emitting pixel array in a display screen and an equivalent spatial period N1 projected by a spatial period N of an optical sensing array in the fingerprint sensor on the plane, it can also avoid the sensor from generating moiré fringes when imaging based on light received by transmitting through the display screen, thereby improving fingerprint identification performance.

In the embodiment of the present application, the positional relationship between the light-emitting pixel array in the display screen and the optical sensing array in the fingerprint sensor can be set, so that the relationship of the equivalent space period N1, M, and K of the optical sensing array satisfies N1<M/2K.

For example, suppose that parameter configuration of the electronic device is as follows:

M=65 um, K=6.6, and N=5 um.

It can be seen that when the fingerprint sensor is not rotated relative to the display screen, the relationship of M, N and K does not satisfy N<M/2K. That is to say, the image captured by the fingerprint sensor will appear moiré fringes.

Figure 9:
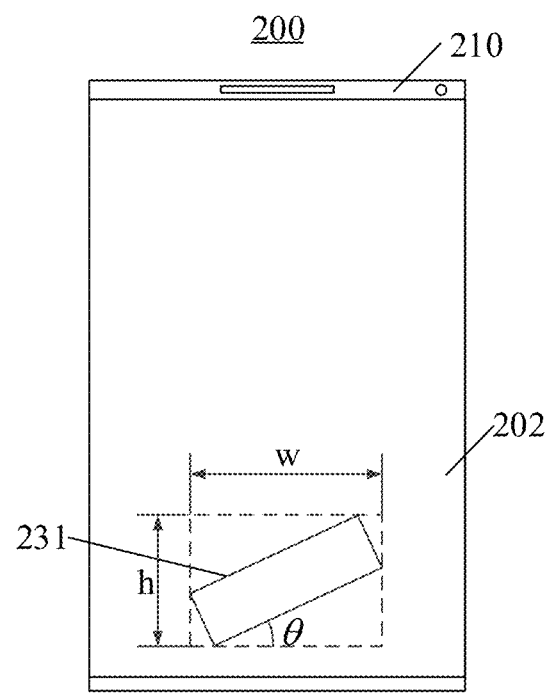
FIG. 9 is another schematic front view of the electronic device according to an embodiment of the present application.
Figure 10:
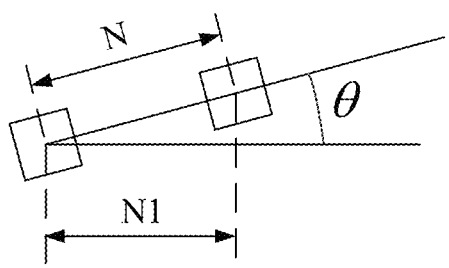
FIG. 10 is a schematic block diagram of two adjacent light-emitting pixel units in the electronic device shown in FIG. 9.

FIG. 9 is a schematic front view of a structure formed by rotating the fingerprint sensor relative to the display screen by a certain angle in the electronic device 200 according to an embodiment of the present application. FIG. 10 is a schematic diagram of a positional relationship between two adjacent optical sensing units shown in FIG. 9.

As shown in FIG. 9, the electronic device includes a protective cover 210, a display screen may be disposed under the protective cover 210, and a fingerprint sensor 231 may be disposed under the display screen. A fingerprint capturing area of the fingerprint sensor 231 is located in a display area 202 of the display screen. The fingerprint sensor 231 is rotated at a certain angle relative to the display screen.

Further, as shown in FIG. 10, assuming that a direction of a row of the light-emitting pixel array in the display screen is the lateral direction of the protective cover 210, a spatial period of the light-emitting pixel array projected on the row of the light-emitting pixel array has a equivalent period cycle N1 of: N*cos θ um.

Assuming that the angle θ shown in FIG. 9 is 15°, then N1=5*cos(15°) um.

It can be seen that 5*cos(π/6)<65/(2*6.6), that is, the relationship of M, N1 and K satisfies N1<M/2K.

It should be understood that FIG. 9 is only an example of the embodiment of the present application and should not be understood as limitation on the present application. For example, the rotation method of the fingerprint sensor 231 is not limited in the embodiment of the present application.

For example, as shown in FIG. 9, the fingerprint sensor 231 may be rotated counterclockwise by a certain angle θ.

Figure 11:
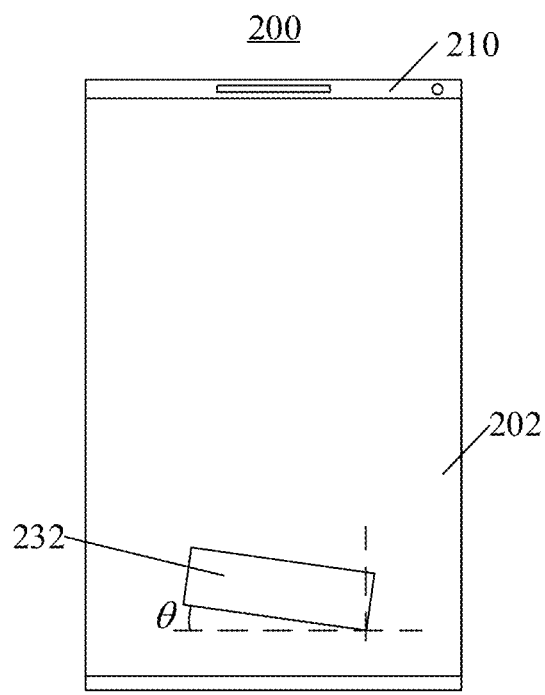
FIG. 11 to FIG. 13 are deformation structures of a structure of the electronic device shown in FIG. 9.

For another example, the fingerprint sensor 232 shown in FIG. 11 may be rotated clockwise by a certain angle θ.

Figure 12:
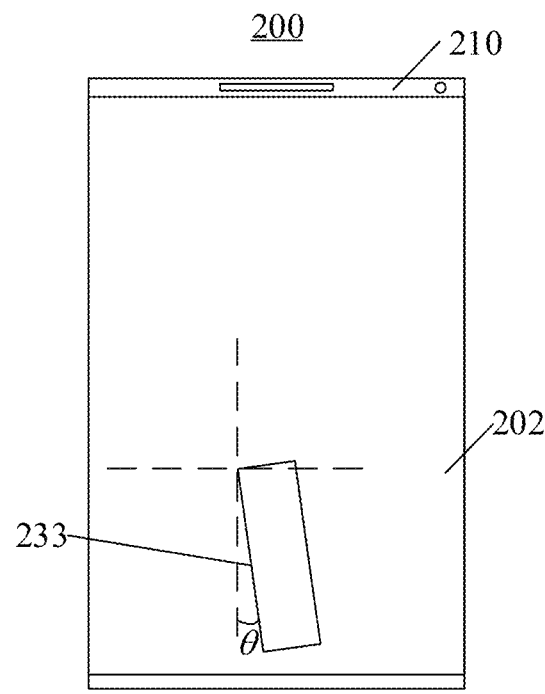

For another example, the fingerprint sensor 233 shown in FIG. 12 may be rotated counterclockwise or clockwise by a certain angle, so that a row of the optical sensing array in the fingerprint sensor 233 and the row of the light-emitting pixel array in the display screen form an angle θ, and the fingerprint sensor 233 is tilted to the left.

Figure 13:
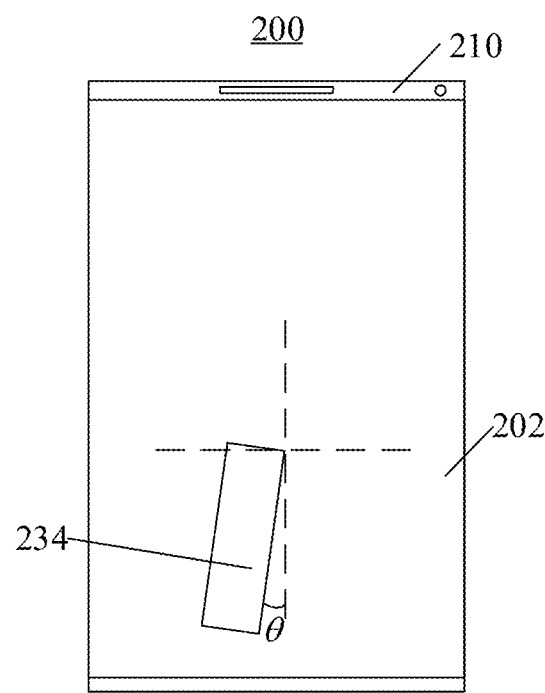

For another example, the fingerprint sensor 234 shown in FIG. 13 can be rotated counterclockwise or clockwise by a certain angle, so that the row of the optical sensing array in the fingerprint sensor 234 and the row of the light-emitting pixel array in the display screen form an angle θ, and the fingerprint sensor 234 is tilted to the right.

For another example, in other alternative embodiments, the fingerprint sensor can also be rotated by a certain angle in the direction perpendicular to the display screen, so that N1<M/2K.

It should be understood that a specific structure of the fingerprint sensor in FIG. 9 to FIG. 13 may refer to the biometric identification module 140 shown in FIG. 1 and FIG. 2, and the relevant description of the protective cover 210 and the display area 202 may refer to the protective cover 110 and the display area 102 shown in FIG. 1 and FIG. 2, respectively, which is not repeatedly described herein in order to avoid repetition.

It should be noted that only when N<M/2K, by setting an angle between the light-emitting pixel array in the display screen and the optical sensing array in the fingerprint sensor, an area occupied by the fingerprint sensor in the electronic device may increase, thereby affecting further optimization of electronic device performance. For example, as shown in FIG. 9, a projected area of the rotated fingerprint sensor on the protective cover 210 of the electronic device is the product of h and w, and is larger than a projected area of the fingerprint sensor 231 on the protective cover 210.

Therefore, in order to avoid the area occupied by the fingerprint sensor in the electronic device, a method of combining the above multiple embodiments can be applied to make N<M/2K.

It should be understood that the combination method of the above 5 embodiments is not specifically limited in the embodiment of the present application.

Figure 14:
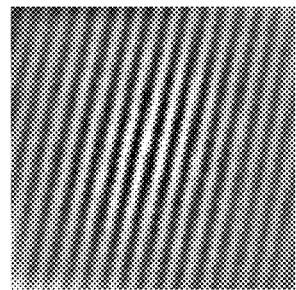
FIG. 14 is a schematic diagram of an image without moiré fringes imaged by the fingerprint identification apparatus according to an embodiment of the present application.

For example, the moiré fringe can be completely eliminated through one or more implementation manners described in the above 5 embodiments. For example, as shown in FIG. 14, the fingerprint sensor of the embodiment of the present application can effectively eliminate the moiré fringes when imaging based on light received by transmitting through the display screen, thereby improving fingerprint identification performance.

For another example, if limited by factors such as production and manufacturing, one or more implementation methods described in the above 5 embodiments may be used to appropriately adjust some parameters within a certain range, thereby reducing the moiré fringes to a certain extent.

It should also be noted that the embodiment of the present application aims to clarify the relationship of M, N and K (i.e., N<M/2K), to weaken or eliminate the moiré fringes. However, the embodiment of the present application does not limit specific values of M, N and K.

For example, a range of a space period N of the optical sensing array may be 1 um-20 um. Preferably, the N may be 3.6 um, 5um, 7.2 um, 12.5 um, etc.

For another example, a range of a space period M of the light-emitting pixel array may be 40 um-120 um. Preferably, the N may be 65 um, 80 um, 85 um, etc.

For another example, a value range of the K may be 1-20. Preferably, the K may be 6.6, etc.

For another example, a range of the angle may be −15° to 15°. Preferably, the angle may be 10°, 8°, 0°, etc.

It should be understood that the above parameters are only an example of the embodiment of the present application and should not be understood as limitation on the present application.

In the several embodiments provided in the present application, it should be understood that, the disclosed fingerprint identification apparatus and electronic device may be implemented in other manners.

For example, the division of the units or modules or components in the apparatus embodiments described above is only a logic function division, other division modes may be adopted in practice, e.g., multiple units or modules or components may be combined or integrated in another system, or some units or modules or components may be omitted or be not executed.

For another example, the units/modules/components described as separate/display components may be or may not be physically separated, namely, may be located in one place, or may be distributed on a plurality of units. Part of or all of the units/modules/components here may be selected according to a practical need to achieve the objectives of the embodiments of the present application.

The above contents are the specific embodiments of the present application only, but the protection scope of the embodiments of present application is not limited thereto, those skilled who are familiar with the art could readily think of variations or substitutions within the technical scope disclosed by the embodiments of the present application, and these variations or substitutions shall fall within the protection scope of the embodiments of the present application. Therefore, the protection scope of the embodiments of the present application should be determined with reference to the protection scope of the claims.

What is claimed is:

1. A fingerprint identification apparatus, comprising:
   a fingerprint sensor comprising an optical sensing array, and a spatial period N of the optical sensing array satisfies N<M/2K;
   wherein M is a spatial period of a light-emitting pixel array, and K is a zoom ratio between an image displayed in a sensing area of the fingerprint sensor and an image captured in the sensing area by the fingerprint sensor;
   wherein the fingerprint identification apparatus further comprises:
   an optical component disposed above the optical sensing array, and configured to guide a light signal emitted by the light-emitting pixel array and reflected from a human finger to the optical sensing array; and
   wherein the optical component comprises:
   a lens, wherein the K is a ratio between an object distance of the lens and an image distance of the lens.

2. The fingerprint identification apparatus according to claim 1, wherein a range of the space period of the optical sensing array is 1 um-20 um.

3. The fingerprint identification apparatus according to claim 2, wherein the space period of the optical sensing array is 5 um.

4. The fingerprint identification apparatus according to claim 1, wherein the space period of the optical sensing array is equal to the sum of a size of an optical sensing unit in the optical sensing array and a distance between two adjacent optical sensing units.

5. The fingerprint identification apparatus according to claim 4, wherein the optical sensing array is configured to reduce the size of the optical sensing unit in the optical sensing array, so that N<M/2K.

6. The fingerprint identification apparatus according to claim 4, wherein the optical sensing array is configured to reduce the distance between the two adjacent optical sensing units in the optical sensing array, so that N<M/2K.

7. The fingerprint identification apparatus according to claim 1, wherein a value range of the K is 1-20.

8. The fingerprint identification apparatus according to claim 1, wherein the optical component is configured to reduce the K, so that N<M/2K.

9. The fingerprint identification apparatus according to claim 1, wherein the lens is configured to reduce the object distance of the lens, so that N<M/2K.

10. The fingerprint identification apparatus according to claim 1, wherein the lens is configured to increase the image distance of the lens, so that N<M/2K.

11. The fingerprint identification apparatus according to claim 1, wherein a row of the optical sensing array has an angel with a row of the light-emitting pixel array.

12. The fingerprint identification apparatus according to claim 11, wherein a range of the angle is −15° to 15°.

13. The fingerprint identification apparatus according to claim 1, wherein a line of the optical sensing array has an angel with a row of the light-emitting pixel array.

14. An electronic device, comprising:
a fingerprint identification apparatus, comprising:
a fingerprint sensor comprising an optical sensing array, and a spatial period N of the optical sensing array satisfies N<M/2K;
wherein M is a spatial period of a light-emitting pixel array, and K is a zoom ratio between an image displayed in a sensing area of the fingerprint sensor and an image captured in the sensing area by the fingerprint sensor; and
a light-emitting pixel array in a display screen; an optical sensing array in the fingerprint identification apparatus configured to receive a light signal emitted by the light-emitting pixel array and formed after being reflected from a human finger, the light signal being used for fingerprint identification;
wherein the fingerprint identification apparatus further comprises:
an optical component disposed above the optical sensing array, and configured to guide a light signal emitted by the light-emitting pixel array and reflected from a human finger to the optical sensing array; and
wherein the optical component comprises:
a lens, wherein the K is a ratio between an object distance of the lens and an image distance of the lens.

15. The electronic device according to claim 14, wherein a range of a space period of the light-emitting pixel array is 40 um-120 um.

16. The electronic device according to claim 14, wherein the space period of the light-emitting pixel array comprises a plurality of light-emitting pixel units, and part of the light-emitting pixel units in the plurality of light-emitting pixel units serve as an excitation light source for the fingerprint identification apparatus.

17. The electronic device according to claim 16, wherein the other part of the light-emitting pixel units in the plurality of light-emitting pixel units are configured to emit a striped light spot.

18. The electronic device according to claim 14, wherein the space period of the light-emitting pixel is equal to the sum of a size of a light-emitting pixel unit in the light-emitting pixel array and a distance between two adjacent light-emitting pixel units.

* * * * *